(12) United States Patent
George

(10) Patent No.: US 6,176,503 B1
(45) Date of Patent: Jan. 23, 2001

(54) TRIPLE-TREE AND RISER STRUCTURE FOR A MOTORCYCLE

(76) Inventor: Gary D. George, 7230 NE. 42$^{nd}$ Ave., Portland, OR (US) 97218

( * ) Notice: Under 35 U.S.C. 154(b), the term of this patent shall be extended for 0 days.

(21) Appl. No.: 09/338,848

(22) Filed: Jun. 23, 1999

(51) Int. Cl.$^7$ ................................................. B62K 21/02
(52) U.S. Cl. ...................... 280/274; 280/276; 280/277; 280/279; 180/219
(58) Field of Search .................................. 280/274, 276, 280/277, 279; 180/219

(56) References Cited

U.S. PATENT DOCUMENTS

| | | | |
|---|---|---|---|
| 2,768,836 | * 10/1956 | Hilber | 280/276 |
| 3,354,975 | 11/1967 | Stuart . | |
| 3,948,424 | * 4/1976 | Hunn et al | 224/41 |
| 3,989,261 | * 11/1976 | Kawaguchi | 280/276 |
| 4,032,168 | * 6/1977 | Emerson | 280/279 |
| 4,046,396 | * 9/1977 | Taylor et al. | 280/281.1 |
| 4,057,264 | * 11/1977 | Suzuki et al. | 280/276 |
| 4,129,317 | * 12/1978 | Bell | 280/281.1 |
| 4,274,647 | 6/1981 | Drake, Jr. . | |
| 4,327,928 | * 5/1982 | Chalmers | 280/277 |
| 4,506,753 | * 3/1985 | Wood, Jr. | 180/210 |
| 4,512,592 | * 4/1985 | Yoshioka | 280/279 |
| 4,524,844 | * 6/1985 | Williams, Jr. | 180/219 |
| 4,561,669 | * 12/1985 | Simons | 280/276 |
| 4,687,072 | * 8/1987 | Komuro | 180/219 |
| 4,735,276 | * 4/1988 | Burton | 180/219 |
| 5,086,866 | * 2/1992 | Banjo et al. | 180/219 |
| 5,257,553 | 11/1993 | Cheng . | |
| 5,715,903 | * 2/1998 | Summers et al. | 180/219 |
| 5,829,773 | * 11/1998 | Rajaee | 280/276 |
| 5,855,388 | * 1/1999 | Brewer | 280/288.4 |
| 5,947,498 | * 9/1999 | Rajaee | 280/276 |
| 6,017,047 | * 1/2000 | Hoose | 280/276 |

FOREIGN PATENT DOCUMENTS 739479 10/1955 (DE) .
4332543A1 3/1994 (DE) .

* cited by examiner

Primary Examiner—Paul N. Dickson
Assistant Examiner—Deanna Draper
(74) Attorney, Agent, or Firm—Kolisch Hartwell Dickinson McCormack & Heuser

(57) ABSTRACT

A structural riser system and organization for use in, and adjacent the front of, a motorcycle, to translate a steering force, which is applied to a handlebar structure, directly to the two fork legs in a front fork assembly in the motorcycle. Elongated risers in the system are anchored to the top of a triple-tree structure, and extend therefrom generally upwardly in axial alignment with the fork legs (on a one-to-one basis) to receive a motorcycle handlebar. The invented organization also provides an equipment mounting region sized to receive selected equipment. The equipment mounting region is bounded laterally by the risers, and vertically by the handlebar and triple-tree structure.

6 Claims, 3 Drawing Sheets

TRIPLE-TREE AND RISER STRUCTURE FOR A MOTORCYCLE

FIELD OF THE INVENTION

The present invention relates generally to motorcycles, and more particularly to a structural riser system for translating steering forces directly to the front wheel-carrying fork assembly of a motorcycle.

BACKGROUND

The configuration of a motorcycle steering column is critical to the safety and maneuverability of the motorcycle. Many motorcycles use what is known as a "triple-tree" structure to couple the front wheel to the main frame of the motorcycle for turning and swinging. Conventionally, a handlebar is attached to the top of the triple-tree structure so that, effectively, a steering force, which "lies" between the front wheel and the rider, communicates with the front wheel through the triple-tree structure.

Typically, the handlebar is attached to the triple-tree structure through a pair of risers which extend generally upward from the triple-tree structure to the handle bar. In addition to providing a physical coupling between the handlebar and triple-tree structure, the risers also function to raise and establish the base height of the handlebar relative to the triple-tree structure. Thus, motorcycle riders may select and install risers of varying lengths to adjust the desired useable height of handlebar.

My discovery, which, forms the underpinary basis of the present invention is that, in subtle but quite important ways, prior art triple-tree/riser systems do not provide optimal steering performance. They exhibit this failure because they rely on an indirect translation of steering forces from the handlebar to the front wheel. In addition, prior-art triple-tree/riser systems do not permit selected equipment to be mounted readily and easily below the handlebar.

SUMMARY

The present invention addresses this prior-art shortcoming by providing a structural riser system and organization for use in, and adjacent the front of, a motorcycle, to communicate a steering force, which is applied to a handlebar structure, more directly to the front fork assembly of the motorcycle than is done in conventional structures. With the proposed system installed for use, two, conventional, axially-telescopic fork legs are anchored to a triple-tree structure. Two elongate risers are anchored with a special new disposition to the top of the triple-tree structure, from which they extend generally upwardly to receive a motorcycle handlebar. The system is configured, in relation to the special disposition just mentioned, so that the long axis of each riser is substantially coincident with the long axis of a different one of the fork legs. This axial coincidence and alignment, inter alia, in what is newly contributed by the present invention, and is what principally accounts for a noticeable improvement in steering management and control. The invented organization also provides a unique equipment-mounting region sized to receive selected equipment. The equipment mounting region is bounded laterally by the risers, and vertically by the handlebar and triple-tree structure. The system of the present invention is fittable, and retrofittable, in just about any conventional motorcycle.

DETAILED DESCRIPTION

Figure 1:
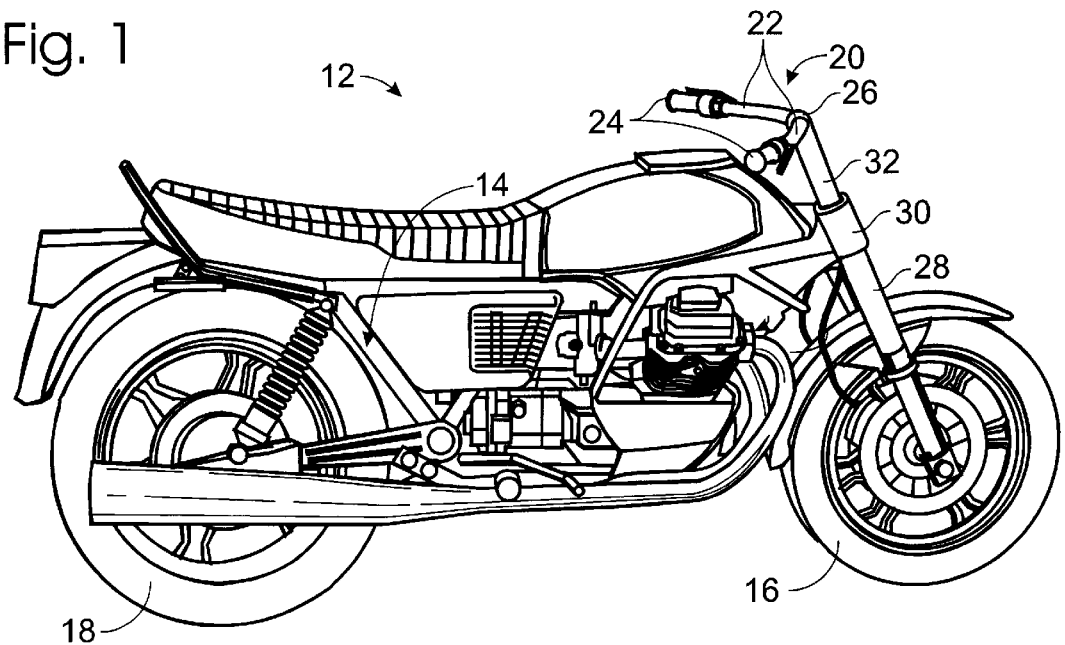
FIG. 1 is a side elevation of a motorcycle employing the riser system of the present invention.

The invented system is designed for use in, and adjacent the front of, a motorcycle, which is indicated generally at 12 in FIG. 1. It will be appreciated that there are many different designs and types of motorcycles well known in the art and that the invented system herein described is not limited to a particular design or type. Therefore, while a generically typical motorcycle is described and depicted herein for illustration purposes, it will be understood that the system of the present invention is suitable for use on any design or type of motorcycle.

Motorcycle 12 typically includes a rider support frame 14 coupled to and carrying a front wheel 16 and a rear wheel 18. A handlebar 20 is functionally attached to front wheel 16, and extends upward to a position adjacent a rider. Handlebar 20 is typically a rigid, elongate structure having opposite end portions 22 joined through an elongate central portion 26, which extends in a substantially horizontal orientation between the end portions. End portions 22 include grip regions 24 configured for gripping by a rider. As is well known in the art, handlebar structure 20 functions as a steering means for motorcycle 12. One often thinks of the steering of a motorcycle as occurring through lateral leaning, but in fact, steering actually occurs (in the context of leaning) through the transmission of steering forces through the handlebars, ultimately to the front wheel. In addition, various equipment and/or motorcycle controls (not shown) may be mounted on or adjacent the handlebar.

Figure 2:
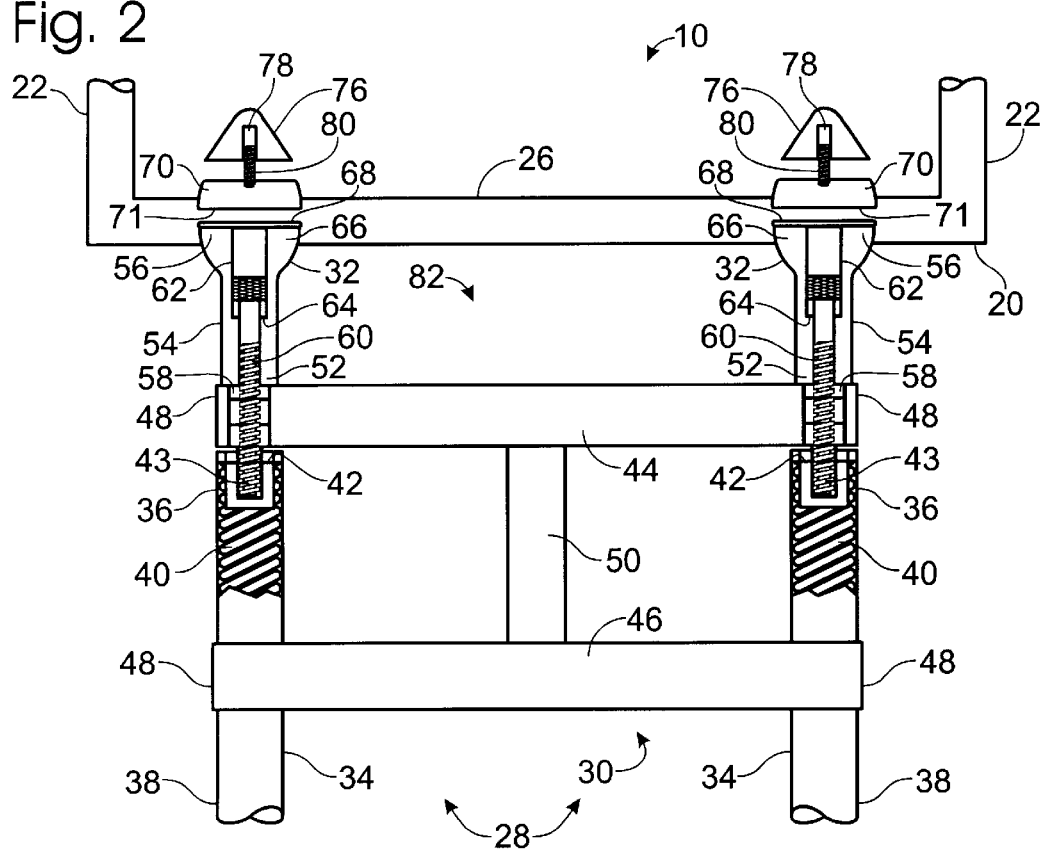
FIG. 2 is a fragmentary, enlarged front elevation of a structural system according to the present invention (the system employed in the motorcycle of FIG. 1) with portions of the fork components cut-away to show the internal compression mechanism and the inner fork plug, and with the risers partially cut-away to show the means of attaching the risers to the front fork assembly.

The invented structural system for translating a steering force from a handlebar structure directly to a motorcycle fork assembly is shown generally at 10 in FIG. 2. System 10 includes a fork assembly 28 rigidly coupled to front wheel 16 of motorcycle 12. A triple-tree structure 30, is appropriately anchored to fork assembly 28 near the latter's upper end, and pivotally couples the fork assembly and front wheel to frame 14. Two elongate risers 32 extend from triple-tree structure 30 to receive handlebar structure 20. Each riser 32 is disposed, relative to triple-tree structure 30 and fork assembly 28, so that a steering force, applied to handlebar structure 20, is translated to the fork assembly with a minimum of related shear stress developing in the triple-tree structure. As will become apparent, the solution of the present invention which leads to this stress elimination, and to other matters which improve steering operation, results principally from the simple, elegant and very effective axial alignment that exist between the long axes of the risers and those of the underlined forks.

Typically, fork assembly 28 includes a pair of elongate, laterally spaced and generally upright and parallel, axially-telescopic fork legs 34. Each fork leg 34 includes an upper fork-leg component 36 and a lower fork-leg component 38. As is well known in the art, lower fork-leg component 38 is coupled to a axle of front wheel 16 to allow front wheel 16 to rotate about its radial axis. Lower fork-leg component 38 is typically received into upper fork-leg component 36 in an axially-telescopic, sliding relationship. Each upper fork-leg component includes an internal compression shock-absorbing mechanism 40 to engage the lower fork-leg component and at least partially insulate a rider from the forces associated with traversing an irregular terrain. An inner fork plug 42, is threadly received in the top of each upper fork-leg component to enclose the internal compression mechanism within the upper fork-leg component.

While fork legs 34 have been described as being generally upright, it will be appreciated that the fork legs of many motorcycles are configured to extend downwardly and outwardly from rider support frame at a substantial incline from the vertical. Such configuration produces a style of motorcycle commonly referred to as a "chopper." Therefore, it will be understood that the description herein of the fork leg configuration being generally upright includes any configuration whereby the fork legs extend upward from the front wheel to the rider support frame, and that the invention is not at all limited to fork legs having a near vertical orientation.

Figure 4:
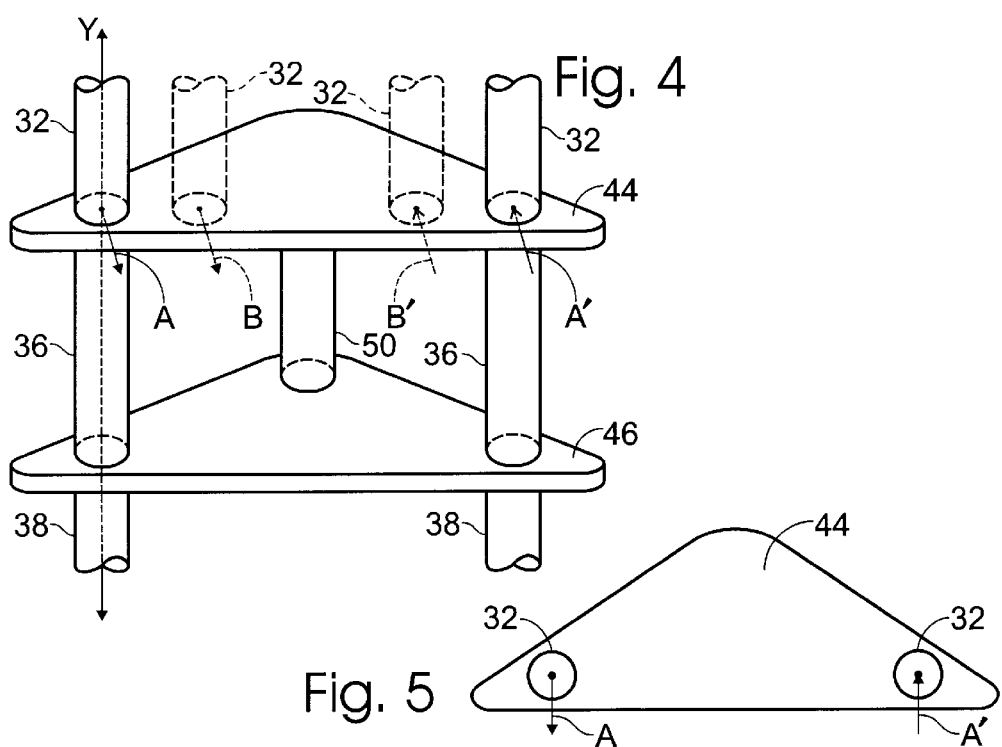
FIG. 4 is a fragmentary, isometric view of the system of FIG. 2, showing the typical prior art configuration in dashed lines and with steering forces schematically represented by vector lines A–A' and B–B'.

Referring now to FIGS. 2 and 4, triple-tree structure 30 typically includes a pair of elongate, vertically spaced and generally parallel triple-tree cross-members, referred to herein as upper triple-tree cross-member 44 and lower triple-tree cross-member 46. The upper and lower triple-tree components illustrated herein are generally triangular shaped thick plates, but may alternatively be formed in other shapes as desired. Upper fork-leg components 36 are received, and rigidly anchored, within opposing ends 48 of each triple-tree cross-member. The upper fork-leg components pass entirely through the lower triple-tree cross-member and abut the bottom of the upper triple-tree cross-member.

A neck stem 50 is connected to, and extends between, the upper and lower triple-tree cross-members at a position substantially equidistant from each upper fork-leg component. Neck stem 50 is received into a cylindrical bearing sleeve on rider support frame 14 so that the neck stem may rotate about its long axis within the sleeve. Thus, the finction of triple-tree structure 30 is to couple the fork assembly pivotally to the rider support frame to allow the front wheel to pivot, as required for steering relative to the rider support frame.

Figure 3:
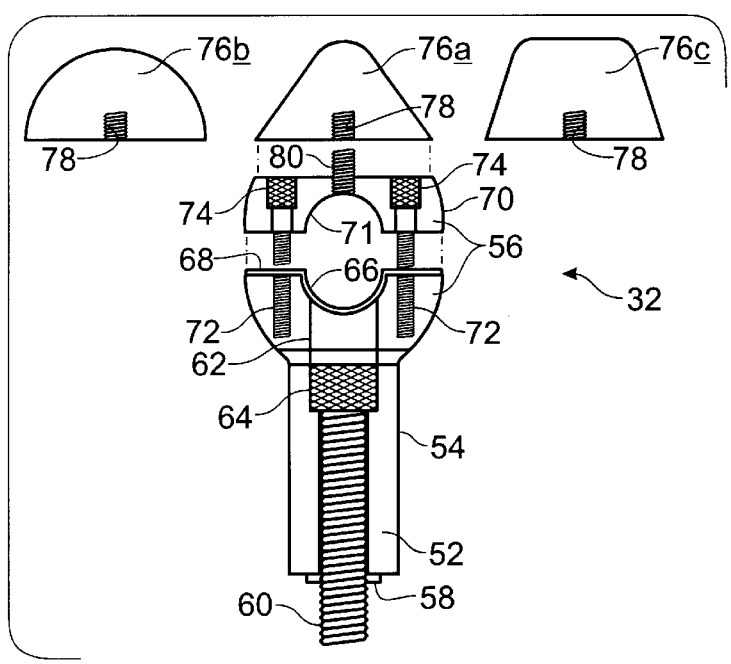
FIG. 3 is a cross-section of the riser of the present invention showing alternative cap shapes.

System 10 includes two laterally spaced, elongate, generally upright and parallel risers 32 anchored to and extending generally upwardly from upper triple-tree cross-member 44. As can be seen in reference to FIGS. 2 and 3, each riser includes a substantially cylindrical central shaft 54 extending between a lower coupling 52 and an upper coupling 56. Lower coupling 52 includes a base 58 disposed on the bottom of shaft 54. Base 58 is formed as a lesser diameter extension on the bottom of shaft 54. Alternatively, base 58 may have the same or a larger diameter than shaft 54. In addition, the lateral cross-section of base 58 may be substantially circular, rectangular, hexagonal, or any other shape adapted to be received into the top of upper triple-tree cross-member 44.

Each shaft 54 includes a longitudinal hole 62 centered about the long axis of the shaft and adapted to receive a mounting bolt 60. Near the top of shaft 54, the diameter of hole 62 is sized to receive the head of bolt 60 so that the bolt is counter-sunk within the shaft. Near the bottom of the shaft, the diameter of the hole is smaller, thereby forming a flange 64 adapted to engage the head of bolt 60 and prevent the bolt from passing through the riser shaft. The shank of bolt 60 extends downward through hole 62 and below base 58. It will be understood that hole 62 is not threaded and that the shank of bolt 60 slides freely within the hole.

The top of shaft 54 is typically flared outward and includes a semi-circular lower saddle 66 configured to receive handlebar structure 20. Alternatively, lower saddle 66 may be differently shaped to receive differently shaped handlebar structures. In one embodiment, a rubber spacer 68 is disposed adjacent each lower saddle to grip the handlebar structure. Top clamp 70 includes holes 72 on either side of an upper saddle 71, which is configured to receive handlebar structure 20. It will be appreciated that upper saddle 71 is typically shaped similar to lower saddle 66. In any event, screws 74 extend through holes 72 to be threadedly received by corresponding holes in the top of shaft 54. The top of shaft 54 and top clamp 70 form an upper coupling 56 configured to removably attach to central portion 26 of handlebar structure 20. It will be appreciated that the top clamp may be loosened to allow the handlebar structure to be rotated about the long axis of the central portion and thereby adjust the grip regions 24 to a height desired by a rider.

In one embodiment, each riser 32 also includes a decorative cap 76 mountable on the upper surface of top clamp 70. As shown in FIG. 2, the cap may be formed in a variety of attractive shapes such as a substantially cone-shaped cap 76a, a semi-hemispherical cap 76b, or a trapezoidal cap 76c. In addition, it will be appreciated that cap 76 may alternatively be formed in a variety of other shapes as desired. In any event, cap 76 functions to cover screws 74 and the upper surface of top clamp 70. Preferably, screws 74 are countersunk below the upper surface of the top clamp so that no gap is left between the cap and the top clamp. A screw 80 is mounted into the top surface of the top clamp and extends generally upward to be threadedly received into a hole 78 in the bottom of the cap.

In accordance with the present invention, each riser is disposed with its long axis substantially coincident with the long axis of a different one of the upper fork-leg components, such as indicated by axis Y in FIG. 4. As illustrated in FIG. 2, the risers are mounted on the top of the upper triple-tree cross-member so that bolts 60 extend through the cross-members and into threaded holes 43 in the top of inner fork plugs 42. When bolts 60 are tightened, the risers form a rigid, substantially co-linear extension of the upper fork-leg components, which extend from upper triple-tree cross-members in a direction generally opposite the upper fork-leg components. The directness of force-transmission action through the risers to the fork legs is thus clearly apparent.

The orientation of the risers, in relation to the fork-legs, ensures that a steering force applied to the handlebar structure is transmitted to the front fork assembly with a minimum of shear stress to the triple-tree structure. This effect can be best seen with reference to FIGS. 4 and 5, in comparison to the prior art organization shown in FIG. 6, and indicated in dashed lines in FIG. 4.

Figure 6:
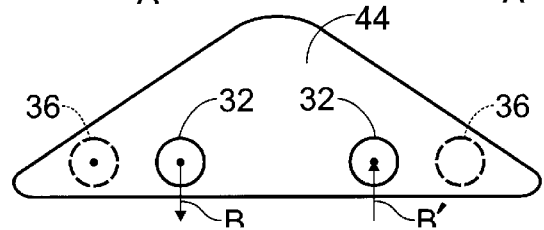
FIG. 6 is a top plan view of a prior art corresponding to FIG. 4, showing the translation of the steering forces through the risers indirectly to the fork legs as shear stress applied to the upper triple-tree cross-member.

In the prior art configuration, risers 34 are disposed so that their long axes are spaced apart from the long axes of the upper fork-leg components. Specifically, the risers of the prior art configuration are disposed between the long axes of the upper fork-leg components. Thus, a steering force, represented by opposing force vector lines B–B' in FIGS. 4 and 6, is applied indirectly through the upper triple-tree cross-member rather than directly to the upper fork-leg components. Consequently, much of the force applied by a rider is translated to the upper triple-tree cross-member as shear stress. The more closely the risers are spaced, the more shear stress is applied to the upper triple-tree crossmember.

Figure 5:
FIG. 5 is a top plan view of the invented system corresponding to FIG. 4, showing the translation of the steering forces through the risers directly to the fork legs.

In contrast, the invented organization minimizes the shear stress applied to the triple-tree structure. A steering force applied to the handlebar structure, represented by opposing force vector lines A–A' in FIGS. 4 and 5, is translated directly through the risers rather than indirectly through the upper triple-tree cross-member. Furthermore, the invented system provides more responsive, and therefore safer, steering control for motorcycle 12.

It will be appreciated that while risers 32 and upper fork-leg components 36 are illustrated as having approximately the same outside diameters, such a correspondence in diameters is not necessary to the invention. Instead, the outer diameters of the upper fork-leg components may be larger or smaller than the outer diameters of the risers. Furthermore, neck stem 50, although shown as disposed behind the upper fork-leg components, may alternatively be disposed generally between the upper fork-leg components within the scope of the invention.

Figure 7:
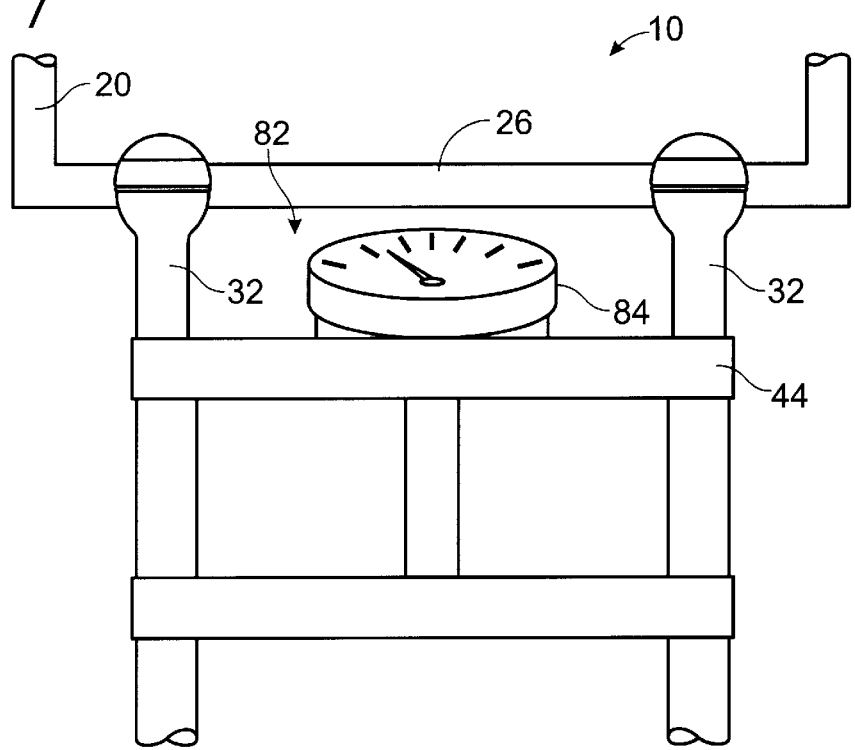
FIG. 7 is a fragmentary rear elevation of the invented structural system in place showing a speedometer mounted in the newly provided equipment mounting region.
Figure 8:
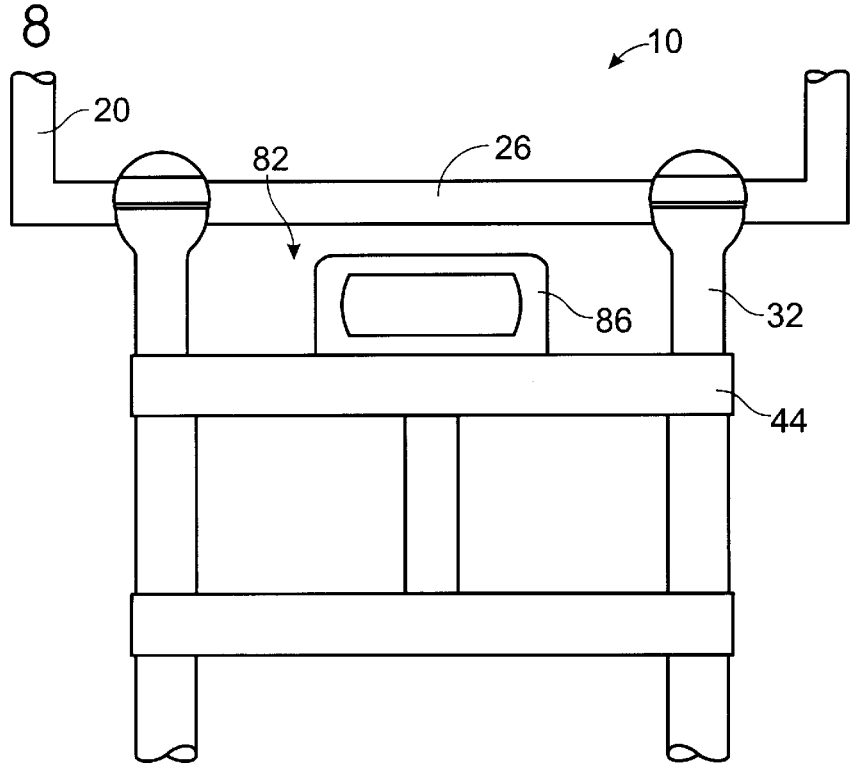
FIG. 8 is a fragmentary front elevation of the invented structural system showing a headlamp mounted in the newly provided equipment mounting region.

Turning attention now to FIGS. 7 and 8, the invented organization also provides a special, centralized, "protective" structural system for accommodating the selective mounting and positioning of certain selected equipment on and in relation to the front suspension of motorcycle 12. With the prior art configuration illustrated, the risers are typically spaced too closely to allow equipment such as speedometer gauges and headlamps to be mounted readily below the handlebar structure. In contrast, the invented system provides more than sufficient clearance to mount one or more pieces of equipment below the handlebar structure.

As shown in FIG. 2, the risers form laterally opposing and generally parallel boundaries of an equipment mounting region 82, which extends laterally and substantially between the long axes of the upper fork-leg components. The handlebar structure is anchored adjacent the upper ends of the risers so that the central portion spans the space between the risers at a location spaced above the upper triple-tree crossmember. Thus, the central portion and the upper triple-tree cross-member define vertically opposing boundaries of equipment mounting region 82.

Although the dimensions of equipment mounting region 82 will vary depending on the length of the risers and the lateral spacing of the upper fork-leg components, the equipment mounting region is preferably sized to accommodate equipment such as speedometer gauge 84, headlamp 86, etc. It will be understood that speedometer gauge 84 and headlamp 86 are standard pieces of equipment well known in the art. In accordance with the invention, such equipment may be mounted in equipment mounting region 82 by attaching the equipment to the upper triple-tree cross-member, the central portion of the handlebar structure, and/or one or both of the risers.

While the invention has been disclosed in its preferred form, the specific embodiments thereof as disclosed and illustrated herein are not to be considered in a limiting sense as numerous variations are possible. Applicant regards the subject matter of his invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicant's invention.

I claim:

1. An organization designed for use in, and adjacent the front of, a motorcycle, comprising:

a pair of elongate, laterally spaced and generally upright and parallel, axially-telescopic fork legs, each having upper and lower ends;

a triple-tree structure including a pair of elongate, vertically spaced and generally parallel triple-tree cross-members, each anchored, adjacent its opposite ends, to a different one of said fork legs adjacent that leg's upper end;

a pair of laterally spaced, elongate, generally upright and parallel risers anchored to and extending generally upwardly from the upper one of said triple-tree cross-members, with each said riser disposed with its long axis substantially coincident with the long axis of a different one of said fork legs; and an elongate handlebar structure including opposite end portions joined through an elongate central portion, anchored to said risers adjacent the upper ends of the risers, with said central portion spanning the space between the risers at a location spaced above said upper triple-tree component.

2. The organization of claim 1, wherein said handlebar structure is anchored to said risers so as to be rotatable about the elongate axis of said central portion.

3. A structural system for accommodating the selective mounting and positioning of certain selected equipment on and in relation to the front suspension of a motorcycle, where that suspension includes, generally, a pair of laterally spaced, elongate, axially-telescopic fork legs having upper fork-leg components anchored to a pair of vertically spaced, upper and lower triple-tree cross-members, said system comprising:

a pair of elongate risers anchored to such upper triple-tree cross-member and extending therefrom in a direction generally axially aligned and opposite such upper fork components, said risers being disposed on such upper triple-tree cross-member to form laterally opposing and generally parallel boundaries of an equipment mounting region on such motorcycle suspension, said region extending laterally and substantially between the elongate axes of such upper fork components; and an elongate handlebar structure including opposing end portions joined through an elongate central portion, said handlebar structure being anchored to said risers adjacent the upper ends of said risers and said central portion vertically spaced from such upper triple-tree cross-member and spanning the space between said risers to define vertically opposing boundaries of said equipment mounting region.

4. The system of claim 3, wherein said central portion is sufficiently spaced from such upper triple-tree cross-member to allow a speedometer gauge to be mounted in the equipment mounting region.

5. The system of claim 3, wherein said central portion is sufficiently spaced from such upper triple-tree cross-member to allow a headlamp to be mounted in the equipment mounting region.

6. An assembly for use in a motorcycle steering system having a handlebar with opposite grip regions joined by a rigid central portion, and a motorcycle front fork assembly having a pair of elongate, laterally spaced, axially-telescopic fork legs, which are coupled, adjacent their upper-ends, to a triple-tree structure which extends between the fork legs, the riser assembly comprising:

a pair of elongate risers, each riser including an upper coupling configured to removably attach to such handlebar, and a lower coupling configured to removably attach to such triple-tree structure in an orientation, in relation to such fork-legs, such that a steering force applied to such grip regions is transmitted to such front fork assembly with a minimum of shear stress to such triple-tree structure.

* * * * *